July 15, 1924.
W. HARTENSTEIN
POTATO PLANTER
Filed Jan. 12, 1923
1,501,335
3 Sheets-Sheet 2
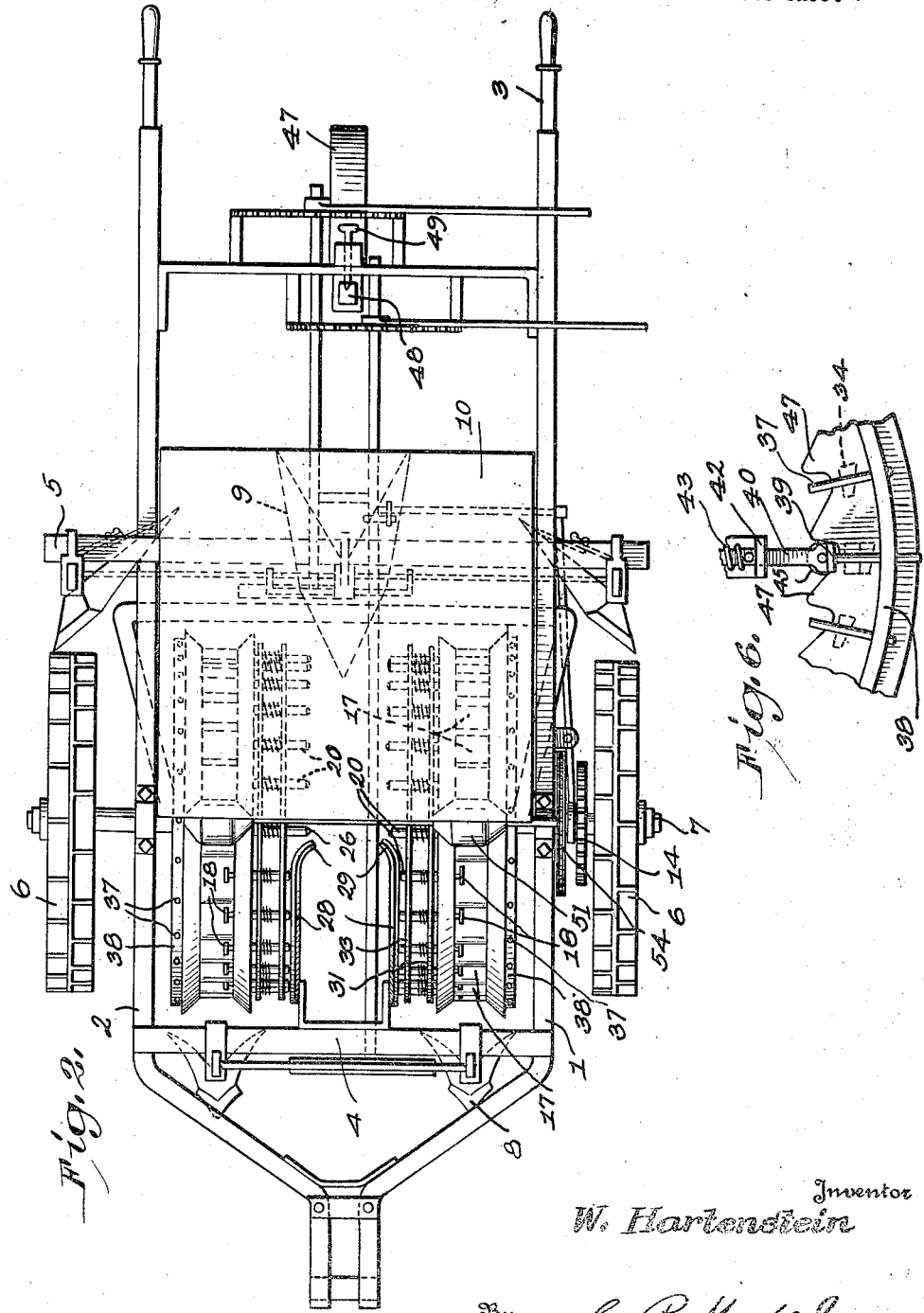
Inventor
W. Hartenstein
By C. P. Hoepel
Attorney July 15, 1924.
W. HARTENSTEIN
POTATO PLANTER
Filed Jan. 12, 1923
1,501,335
3 Sheets-Sheet 3
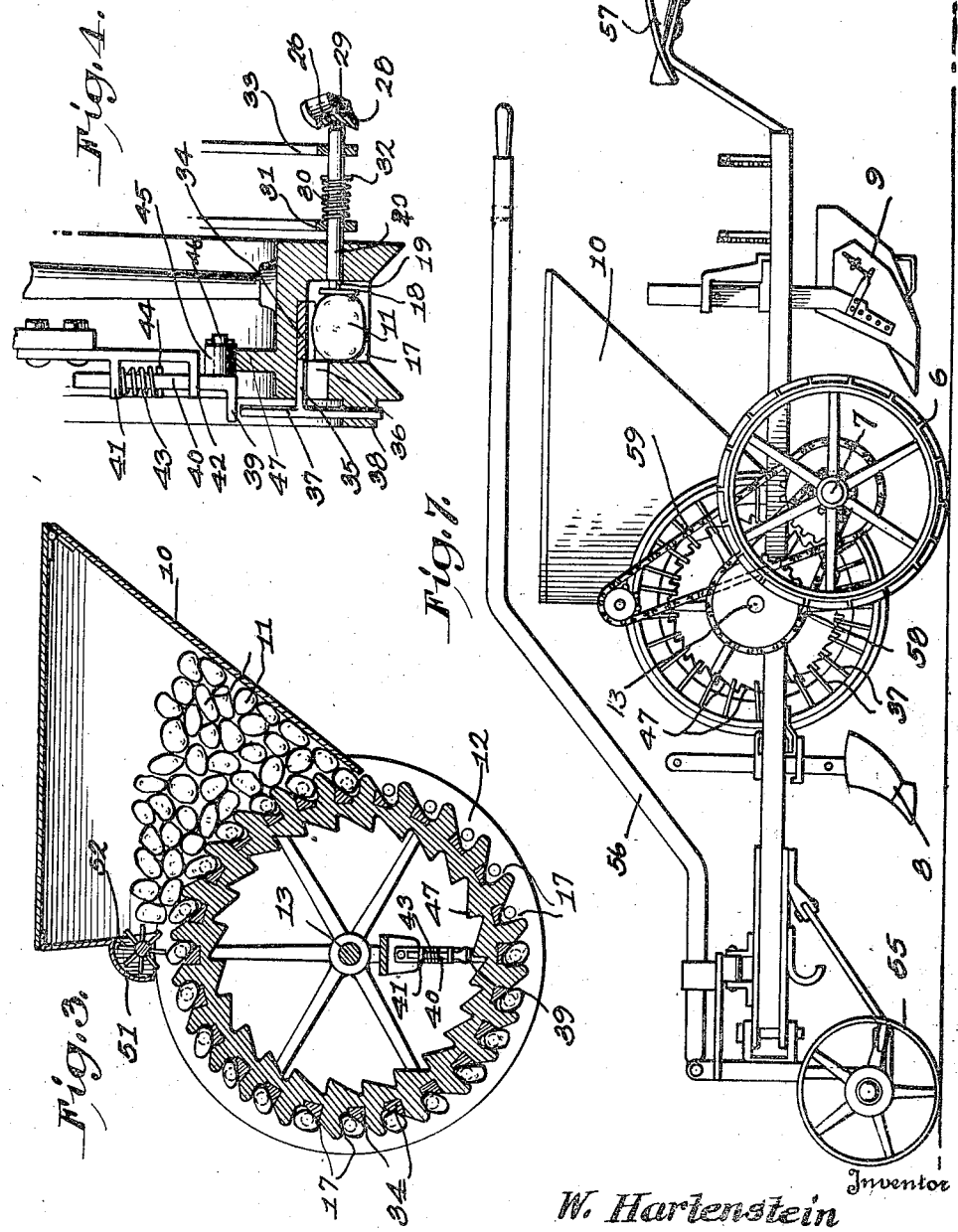

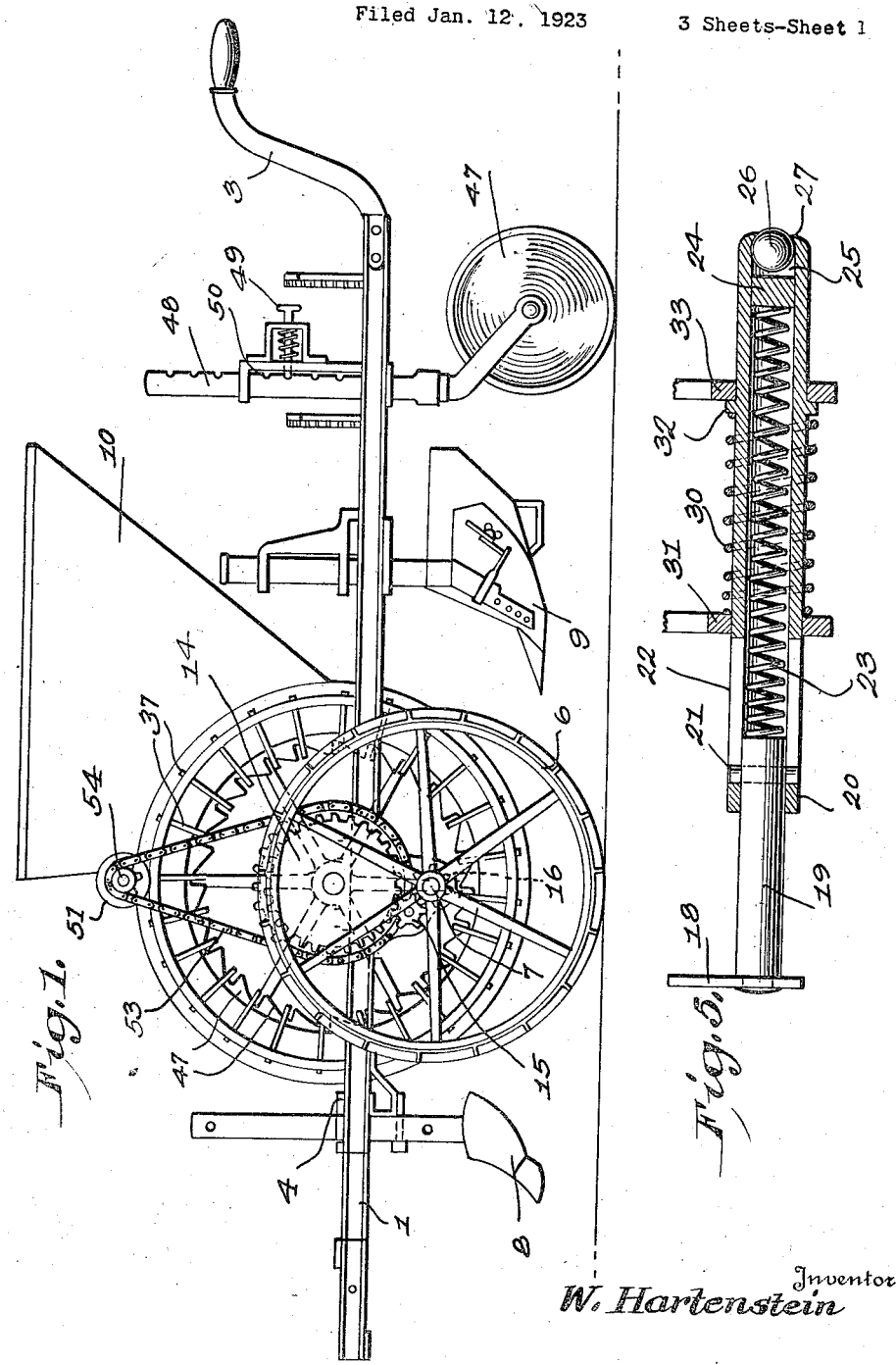

Patented July 15, 1924.

1,501,335

UNITED STATES PATENT OFFICE.

WILLY HARTENSTEIN, OF NUREMBERG, GERMANY, ASSIGNOR TO JOSEPHINE AMAN, OF RUTHERFORD, NEW JERSEY.

POTATO PLANTER.

Application filed January 12, 1923. Serial No. 612,353.

*To all whom it may concern:*

Be it known that WILLY HARTENSTEIN, a citizen of Germany, and resident of Nuremberg, Germany, has invented certain new and useful Improvements in Potato Planters, of which the following is a specification.

The present invention relates to improvements in potato planters and has for an object to provide for the even and uniform distribution of potatoes or the like into a furrow plowed by the machine, the potatoes being subsequently covered over by shovels also carried by the machine whereby these several functions are all performed in substantially one operation.

Other objects of the invention reside in so arranging contructing and coordinating the various parts of the device as to secure a compact construction of distributor for the potatoes; to insure the delivery one by one of the potatoes to the furrow; to provide a rotary drum having pockets in which the potatoes are singly received and subsequently discharged; to prevent the escape of the potatoes from the pockets in the drum except as each pocket arrives at a predetermined point for the delivery of the potato whereby such holding means is released and to further provide for the positive ejection of the potatoes from the pockets.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of a planting machine constructed according to the present invention.

Figure 2 is a top plan view of the same.

Figure 3 is a vertical section through the proper and distributing drum.

Figure 4 is an enlarged fragmentary cross section through a portion of the drum showing the retaining and ejecting device.

Figure 5 is a longitudinal section through the ejecting plunger and associated parts.

Figure 6 is a fragmentary side view of the ejection device, and

Figure 7 is a side view of a modified form of the machine.

Referring more particularly to the drawings, the machine is composed of a frame work made up of side rails 1 and 2 converged forwardly and preferably secured together and having upturned and rearwardly disposed handles 3 at the rear ends thereof, these side rails being appropriately braced at suitable intervals apart by the transverse beams 4 and 5.

The frame is supported on the ground wheels 6 rotating about the axle 7 which is carried in suitable bearings extending beneath the side rails 1 and 2. One or more plows 8 are carried forwardly of the frame and are suspended for instance from the front cross beam 4 while a shovel 9 of a double character is carried by the rear beam 5 centrally of the machine in order that the opposite moldboards may cover the furrows made by the two laterally disposed plows.

Now according to the invention a hopper 10 is provided upon the machine in which to carry the potatoes or other material to be planted indicated at 11 in Figure 3, the lower forward portion of the hopper being open and appropriately shaped to admit the rotating drum 12 mounted upon the shaft 13 also suitably journaled upon the frame work above the axle and being driven from the axle as by the use of a gear wheel 14 fixed upon the shaft 13 at one end and meshing with an intermediate pinion 15 and drive pinion 16 upon the axle 7. By the use of this gear train a rotary motion of the desired direction and speed is communicated to the drum 12 as the machine progresses through the field.

In the periphery of the drum are pockets 17 having their walls forwardly inclined in the direction of rotation in order to with better facility pick up the potatoes from the hopper 10 and hold these potatoes from escape by reason of the continuous travel of the drum through the potato mass. In each pocket is a retaining device for the potatoes shown to the best advantages in Figures 4 and 5 in which 18 designates a retaining plate having a side wise movement in each pocket and adapted to engage the potato 11 therein and force it against the outer pocket wall. The retaining plate 18 is carried upon a plunger 19 sliding in a hollow barrel 20 and guided by a pin 21 the ends of which engage in diametrically disposed slots 22 in the barrel extending axially thereof.

A coil spring 23 lying within the barrel is adapted to force the plunger 19 outwardly to the position shown in Figure 5 where the pin ends 21 arrest the movement by abutting against the ends of the slots 22. The spring 23 abuts at this opposite end against a fixed or slided block 24 which separates the chamber in which the spring 23 lies from a compartment 25 for receiving a rotary ball 26 which is confined by the inwardly swaged end 27 of the barrel, permitting the ball to project and to come into contact with the side portions of a cam rail 28 of V-section as shown in Figure 4. This cam rail extends half way around the drum at its inner side, beginning at the top portion thereof where the rail is outwardly turned as indicated at 29 in Figure 2 to receive and guide the ball and plunger thereinto and the bottom portion of the rail which ends at substantially the lower side of the drum is also outwardly curved as indicated in Figure 4 in order to permit the ball and the barrel to again project outwardly. This outward movement of the barrel 20 is secured automatically by the presence of the coil spring 30 which is wound about the intermediate portion of the barrel and between the supporting ring 31 through which the barrel is slidable and a pin or shoulder 32 upon the barrel itself. Incidently this pin or shoulder 32 abuts against the companion ring 33 which also serves to slidably support the barrel. These rings 31 and 33 are carried preferably by the drum.

Each pocket is also provided with an ejection plunger 34 preferably occupying a recess in the base of the pocket and adapted to move radially outward to force the potato 11 before it. Each plunger 34 is carried by a laterally projecting arm 35 extending through a radially elongated slot 36 in the side of the drum. The arm 35 is secured to a pin 37 mounted at its outer end to reciprocate in a perforated flange 38 upon the outer side of the drum. The inner ends of all of the pins 37 are adapted to consecutively register beneath a hammer 39 carried on the lower end of the reciprocating rod 40 mounted in bracket arms 41 and 42 carried by a suitable portion of the frame. A coil spring 43 mounted between the upper arm 41 and a pin 44 of the rod 40 tends to force the hammer down, while the roller 45 on a pin 46 projecting out from the lower end of the rod or hammer is adapted to engage with a series of inclined faces 47 upon the inner portion of the drum.

The frame shown in Figure 1 is adapted to be drawn by animals and is provided with a rear castor wheel 47 with suitable devices to adjust its height for the purpose of gaging the depth of the implement. For instance the castor wheel is carried by a notched bar 48 in which the spring pressed pin 49 carried by the bracket 50 is adapted to successively engage. It will also be understood that appropriate adjusting devices may be mounted in conjunction with the plows and the shovel.

In connection with Figure 3 it will be noted that in an extension housing 51 forwardly of the hopper 10 is a spoked wheel 52 rotating in a counter clockwise direction by virtue of the chain 53 shown in Figure 1 which engages about sprockets upon the shaft 13 and the wheel shaft 54. The function of this spoked wheel rotating in the direction stated is to force the potatoes backwardly as otherwise the tendency induced by the rotation of the drum would be to carry the potatoes toward the forward wall of the hopper and to possibly injure the same on account of the space required for the suitable clearance between the wheel and the hopper wall.

In Figure 7 the general arrangement of the machine is changed somewhat, without however altering its essential functions. For instance a castor wheel 55 is mounted at the front of the machine and is turned by the use of the long handle 56 extending above the hopper and into proximity to the seat 57 carried by the rear of the frame work in order that the occupant of the seat may continuously steer the machine. In this case also the axle upon which the ground wheels 6 are mounted is rearwardly of the shaft 7 for the drums and the chain 58 is employed in connection with suitable sprockets to transmit motion to the drum and a chain 59 is employed to drive the spoked wheel 52 directly from the axle rather than from the drum shaft.

Now in the operation of the machine, the drum rotating in a counter clockwise direction as view in Figure 3 causes the pockets 17 to receive potatoes while passing through the hopper 10. As soon as the drum passes its uppermost point, each pocket will successively have its retaining plate 18 moved sidewise against the potato 11 therein forcing the potato against the opposite wall as shown in Figure 4 and completely retaining it in place as otherwise the potato would escape before the predetermined time, this escape being induced by the inclined character of the pocket walls. The movement of the retaining plate 18 is caused by engagement of the barrel or its wall 26 with the outturned end 29 of the cam rail 28. The plunger is thus turned inwardly as shown in Figures 2 and 4 against the influence of the coil spring 30. When the pocket carrying the potato reaches the lowest point of the drum or the point at which it is desired to discharge the potato 11 into the furrow produced by the plow 8 preceding the distributing mechanism, the cam rail 28 recedes away from the barrel and permits the coil spring 30 to again come into play and shift the retaining plate 18 out of contact with the potato in the pocket, thus permitting it to fall into the furrow.

In case the potato should become jammed or stuck in the pocket, the ejecting plunger 34 will also be driven downwardly at this point to insure the expulsion of the potato from the pocket. This is accomplished by the hammer 39 coming into contact with the stem 37 upon each successive presentation of the low point in the inclined lugs 47 upon the drum. In other words the roller 45 will ride up the inclined surface and after the abrupt wall has passed the spring 43 will force both roller and hammer forcibly downwardly, the hammer driving the stem 37 and actuating each plunger 34 in turn. The ejecting plunger will be returned to initial position by the weight of the potatoes entering the pockets and by the force of gravity upon the upper side of the drum.

As indicated in Figure 2 the machine may carry two drums for distributing potatoes into the two furrows formed by the twin plows 8, but it will be understood that a single frame may be employed in conjunction with only one plow or the plows and the distributing drums might be increased without however changing the nature or the principle of the invention.

It will be appreciated from the foregoing that the drum will acquire potatoes from the hopper in pockets equally spaced apart and that these potatoes will be effectively retained in the pockets until each pocket arrives at a predetermined distributing point whereupon not only the retaining means is removed but the positive delivery of the potato at this time is secured by the ejecting device thus providing for the uniform spacing of the potatoes and consequently promoting a better growth in the plants.

It is obvious that various changes and modifications may be made in the details of construction and design of the above specifically described embodiment of this invention without departing from the spirit thereof, such changes and modifications being restricted only by the scope of the following claims.

What is claimed is:

1. A planter for potatoes or the like comprising a movable frame, a hopper thereon for receiving a supply of potatoes, a drum rotating upon the frame and moving through said hopper, said drum having pockets to singly receive potatoes, and means for binding the potatoes in said pockets, said binding means being releasable whereby to deposit the potatoes in the ground, and said binding means acting in a direction substantially transverse to the plane of rotation of the drum.

2. In a machine of the character described, a movable frame work, a contained carried thereby, a pocketed drum moving through the container, and yieldable retaining means lying in the pockets of the drum, and ejecting means also mounted in such pockets and adapted to be actuated at one point in the rotation of the drum.

3. In a machine for planting potatoes and the like, a movable frame work, a container thereon, a drum moving through the container and having pockets with inclined walls, a rotary spoked member engaging the potatoes at the point where the drum emerges from the container.

4. In a machine for planting potatoes and the like, a movable frame work, a container thereon, a pocketed drum moving through the container, laterally reciprocating means in said retaining means to engage the potato in the pocket during approximately a half revolution of the drum.

5. In a machine for planting potatoes and the like, a movable framework, a container held thereby a rotary pocketed drum moving through the container, a laterally reciprocating retaining plate in each pocket of the drum, yieldable means for forcing said plunger into contact with the potato in the pocket and a cam rail extending at one side of the drum and for approximately one half of its circumferential length and positioned for engaging said yieldable means.

6. In a machine for planting potatoes, a movable frame work, a container thereon, a rotary drum moving through said container and having circumferential pockets, ejecting plungers mounted in said pockets, and a hammer mechanism carried by the frame work for actuating said plungers.

7. In a machine for planting potatoes and the like, a movable frame work, a container thereon, a rotary drum moving through the container and having circumferential pockets, ejecting plungers mounted in the base of the pockets and having actuating stem extending upon the exterior of the drum and actuated thereby, and a hammer mechanism for engaging said stems to actuate the plungers.

8. In a machine for planting potatoes and the like, a movable frame work, a container thereon, a drum moving through the container and having a circumferential series of pockets, ejecting plungers mounted in the pockets and having stems exterior thereof actuated by said frame, a spring pressed hammer mechanism arranged to engage successively said stem, a projection on the drum for moving said hammer mechanism to a potential position and subsequently releasing same.

9. In a machine for planting potatoes and the like, the combination of a movable frame work, a container on the frame work, a pocketed drum moving through the container, a rotary spoked member arranged at the point where the drum emerges from the container and adapted to be driven from motion derived from the movement of the frame work, laterally projecting retaining means in the pockets of said drum, and ejecting plunger in the base of each pocket, and a spring actuated hammer for moving said plungers.

In testimony that I claim the foregoing as my invention, I have signed my name hereunder.

WILLY HARTENSTEIN.

Witnesses:
ALESANDRE W. DEETS,
THERESE KELLER.